Figure 1:
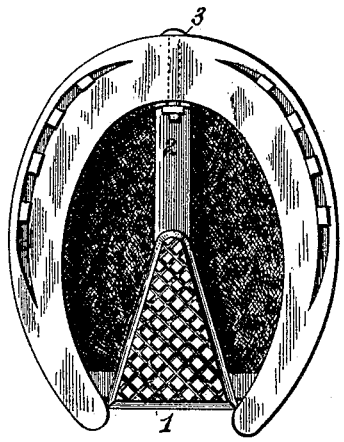

(No Model.)

L. C. TIFFANY.
ARTIFICIAL FROG FOR HORSES' FEET.

No. 511,918. Patented Jan. 2, 1894.

WITNESSES.
Victor J. Evans.
L. M. Marble

INVENTOR.
Lansing C. Tiffany.
By E. M. Marble
Attorney.

THE NATIONAL LITHOGRAPHING COMPANY,
WASHINGTON, D. C.

UNITED STATES PATENT OFFICE.

LANSING C. TIFFANY, OF SPRINGFIELD, ILLINOIS.

ARTIFICIAL FROG FOR HORSES' FEET.

SPECIFICATION forming part of Letters Patent No. 511,918, dated January 2, 1894.

Application filed March 2, 1893. Serial No. 464,360. (No model.)

*To all whom it may concern:*

Be it known that I, LANSING C. TIFFANY, a citizen of the United States, residing at Springfield, in the county of Sangamon and State of Illinois, have invented certain new and useful Improvements in Artificial Frogs for Horses' Feet; and I do hereby declare the following to be a full, clear, and exact description of the invention, such as will enable others skilled in the art to which it appertains to make and use the same.

My invention relates generally to pads for the hoofs of horses, and particularly to that class thereof which are designed for the purpose of creating a natural frog pressure, and it consists in the construction and arrangement of parts hereinafter to be described, and particularly pointed out in the claim.

The object of my invention is to produce such a frog pressure on the frog of the hoof of a shod horse, as would naturally be felt were the horse unshod, but which cannot be obtained with a shod hoof, on account of the frog being elevated above the ground to the extent of the thickness of the shoe at the heels, without the employment of a device similar to that which I have invented. This object I attain by the use of an artificial frog, formed of rubber or other suitable elastic material, and molded or otherwise constructed to conform with the shape of the frog, or in other words to be pyramidal in shape, which is held in position on the horse's frog by means of a toe-clip, side clips, and a locking device, as will be hereinafter described.

My invention is fully illustrated in the drawings accompanying and forming a part of this specification, in which the same reference numerals refer to the same or corresponding parts, and in which—

Figure 2:
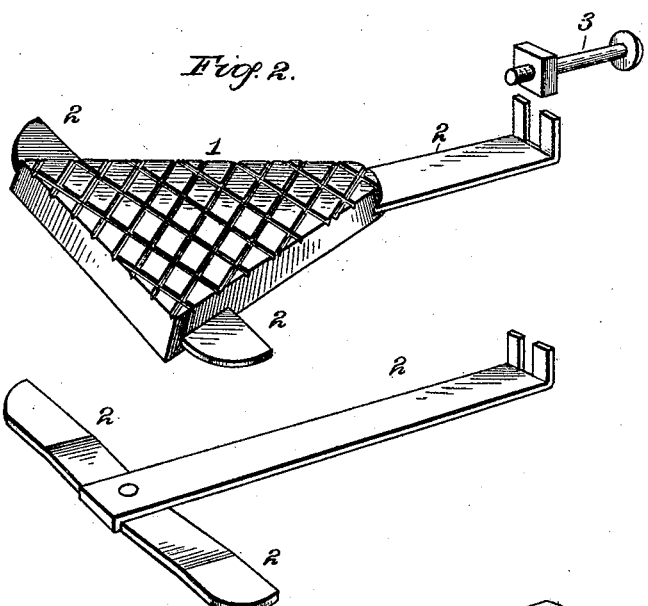
Figure 3:
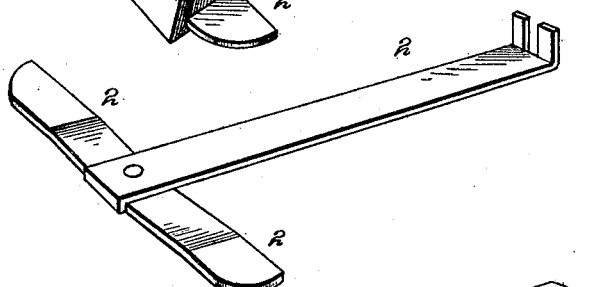
Figure 4:
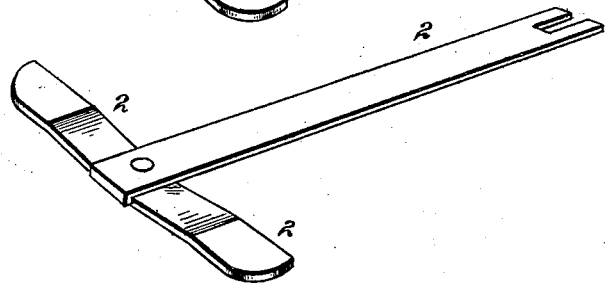

Figure 1 is a bottom plan view of the shod hoof of a horse, my improved frog pad being represented in its proper position. Fig. 2 is a detail view of my frog pad. Figs. 3 and 4 are views of the metal piece forming the toe and side clips, Fig. 3 showing the piece completely formed, and Fig. 4 showing the same in an incomplete state.

Referring to the drawings, 1 indicates the body portion of the pad or cushion, which is constructed of rubber or other elastic material, and is molded or otherwise formed to conform with the shape of the frog of a horse's hoof, or, in other words, is pyramidal in shape. This pad is of such a thickness that it will touch the ground with a natural pressure when in position on a horse's hoof, and its bottom surface is corrugated or otherwise roughened to prevent its slipping, or this object may be attained by attaching or partially embedding into the bottom of the pad a metallic plate, (not shown,) which would have the added advantage of protecting the pad from wear.

In the pad or cushion 1, and near the non-corrugated or top surface of the same, is embedded the metal piece 2, which, as shown in Figs. 3 and 4, is T-shaped, and when completely formed has the end of its long arm slotted, and bent upward for the reception of the locking bolt 3. The two ends of the cross of the T are rounded at their outer ends, so that when the pad is placed in position on a horse's hoof, and these ends are inserted between the horseshoe and the hoof of the horse, the said ends may not project beyond the side of the hoof of the horse.

When the pad is to be applied to the frog of a horse's hoof, it is placed upon the same and shoved forward, the ends of the cross of the T, 2, passing between the heels of the horseshoe and the hoof of the horse, until the upturned end of the long arm of the T, which acts as a toe clip, strikes against the front of the shoe. This up-turned end, in the position the pad is placed, points downward. When the locking bolt 3 is adjusted in position, as represented in Fig. 1, and the nut to the same tightly screwed in place, the hoof pad is securely held in position, and prevented from moving in any direction. The pad can be removed by simply taking off the locking bolt, and sliding the entire pad backward.

From the fact that my improved pad covers only the frog, pressure is localized at that particular point, and the weight bearing structures of the hoof,—the wall and the frog,—are brought into action, while the non-weight bearing structure,—the sole,—is relieved from all unnecessary pressure. The sole of the hoof is left bare, and subjected to the action of the atmosphere and the moisture of the earth, but is relieved from the suction to which it is ordinarily subjected when the horse is traveling on muddy ground.

The attachment and detachment of my pad to and from a horse's hoof are easily and quickly performed. Different sizes of pads with metal pieces embedded therein will of course be provided for different sizes of shoes.

Having thus fully described my invention, what I claim as new, and desire to secure by Letters Patent, is—

In an artificial frog, the combination with the pad 1 made of rubber or other suitable material, of the metal piece 2 embedded in the same and forming both the side and toe clips, and the bolt 3 for locking said pad in place, substantially as described.

In testimony whereof I affix my signature in presence of two witnesses.

LANSING C. TIFFANY.

Witnesses:
P. K. KINSELLES,
W. T. DOWNS.